(12) United States Patent
Kim et al.

(10) Patent No.: US 9,283,693 B2
(45) Date of Patent: Mar. 15, 2016

(54) HOT PRESS SINTERING APPARATUS AND PRESS ELEMENT

(75) Inventors: Min Sung Kim, Seoul (KR); Myeong Jeong Kim, Seoul (KR); Young Nam Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 370 days.

(21) Appl. No.: 13/813,323

(22) PCT Filed: Jul. 27, 2011

(86) PCT No.: PCT/KR2011/005542
§ 371 (c)(1),
(2), (4) Date: Apr. 9, 2013

(87) PCT Pub. No.: WO2012/015243
PCT Pub. Date: Feb. 2, 2012

(65) Prior Publication Data
US 2013/0189389 A1    Jul. 25, 2013

(30) Foreign Application Priority Data

Jul. 30, 2010 (KR) .................. 10-2010-0074432
Jan. 31, 2011 (KR) .................. 10-2011-0009814

(51) Int. Cl.
*B28B 3/02* (2006.01)
*B22F 3/14* (2006.01)
(Continued)

(52) U.S. Cl.
CPC . *B28B 3/025* (2013.01); *B22F 3/14* (2013.01); *B28B 3/08* (2013.01); *B30B 11/007* (2013.01); *B30B 15/067* (2013.01); *B30B 15/068* (2013.01); *C04B 35/565* (2013.01); *C04B 35/63476* (2013.01); *C04B 35/645* (2013.01);
(Continued)

(58) Field of Classification Search
CPC ............ B28B 3/025; B28B 3/08; B22F 3/00; B30B 11/007; B30B 15/067; B30B 15/068; C04B 35/565; C04B 35/63476; C04B 35/645; C04B 2235/48; C04B 2235/5436; C04B 2235/77
See application file for complete search history.

(56) References Cited

U.S. PATENT DOCUMENTS 1,248,800 A * 12/1917 Brinkman ............... 219/243
3,213,491 A * 10/1965 Craig ...................... 425/78
(Continued)

FOREIGN PATENT DOCUMENTS

JP      52130406 A    11/1977
JP       602601 A     1/1985
(Continued)

OTHER PUBLICATIONS

International Search Report in International Application No. PCT/KR2011/005542, filed Jul. 27, 2011.
(Continued)

*Primary Examiner* — Yogendra Gupta
*Assistant Examiner* — Emmanuel S Luk
(74) *Attorney, Agent, or Firm* — Saliwanchik, Lloyd & Eisenschenk

(57) ABSTRACT

A hot press sintering apparatus according to the embodiment includes a chamber; a mold member located in the chamber and including a mold space section to be filled with a raw material; a press member for pressing and processing the raw material in the mold member; and a heating member for heating an interior of the chamber. The mold member includes a first mold part and a second mold part inserted into the first mold part and formed with the mold space section.

11 Claims, 2 Drawing Sheets

(51) Int. Cl.
  *B28B 3/08* (2006.01)
  *B30B 11/00* (2006.01)
  *B30B 15/06* (2006.01)
  *C04B 35/565* (2006.01)
  *C04B 35/634* (2006.01)
  *C04B 35/645* (2006.01)

(52) U.S. Cl.
  CPC ..... *C04B 2235/48* (2013.01); *C04B 2235/5436* (2013.01); *C04B 2235/77* (2013.01)

(56) References Cited

U.S. PATENT DOCUMENTS

| | | | | |
|---|---|---|---|---|
| 3,694,127 | A * | 9/1972 | Takahashi et al. | 425/352 |
| 4,314,961 | A * | 2/1982 | Steinkamp et al. | 264/325 |
| 4,325,734 | A * | 4/1982 | Burrage et al. | 419/60 |
| 4,666,389 | A * | 5/1987 | Relis et al. | 425/78 |
| 4,785,574 | A * | 11/1988 | Fiorentino | 425/78 |
| 4,874,564 | A * | 10/1989 | Sudani et al. | 264/29.7 |
| 4,912,302 | A * | 3/1990 | Kobayashi et al. | 219/390 |
| 5,024,811 | A * | 6/1991 | Hinzmann et al. | 419/66 |
| 5,043,111 | A * | 8/1991 | Hinzmann et al. | 264/40.5 |
| 5,043,123 | A * | 8/1991 | Gormanns et al. | 264/113 |
| 5,211,786 | A * | 5/1993 | Enloe et al. | 156/89.25 |
| 5,364,253 | A * | 11/1994 | Kojima et al. | 425/78 |
| 5,694,640 | A * | 12/1997 | Greetham | 419/38 |
| 6,187,087 | B1 * | 2/2001 | Yoo et al. | 117/7 |
| 6,371,746 | B1 * | 4/2002 | Shiomi et al. | 425/78 |
| 2002/0021779 | A1 * | 2/2002 | Murakami et al. | 376/423 |
| 2004/0182700 | A1 * | 9/2004 | Natsume et al. | 204/298.13 |
| 2004/0265405 | A1 * | 12/2004 | Akyuz et al. | 425/78 |
| 2012/0094145 | A1 * | 4/2012 | Chang et al. | 428/632 |
| 2012/0107641 | A1 * | 5/2012 | Chang et al. | 428/623 |
| 2012/0137596 | A1 * | 6/2012 | Ujihashi et al. | 51/309 |
| 2012/0156479 | A1 * | 6/2012 | Nakamura et al. | 428/336 |
| 2012/0305391 | A1 * | 12/2012 | Kim et al. | 204/298.13 |
| 2013/0154146 | A1 * | 6/2013 | Adachi et al. | 264/40.3 |
| 2013/0160492 | A1 * | 6/2013 | Villalobos et al. | 65/17.3 |
| 2013/0280520 | A1 * | 10/2013 | Pan et al. | 428/331 |
| 2014/0203461 | A1 * | 7/2014 | Ravichandran et al. | 264/1.7 |
| 2014/0356274 | A1 * | 12/2014 | Han et al. | 423/345 |

FOREIGN PATENT DOCUMENTS

| | | |
|---|---|---|
| JP | 62100491 U | 6/1987 |
| JP | 63255303 A | 10/1988 |
| JP | 2147795 U | 12/1990 |
| JP | 03199303 A | 8/1991 |
| JP | 05-039504 A | 2/1993 |
| JP | 05-186230 A | 7/1993 |
| JP | 08-178546 A | 7/1996 |
| JP | 10251068 A | 9/1998 |
| JP | 200396505 A | 4/2003 |
| JP | 2007-112699 A | 5/2007 |
| JP | 2007-246938 A | 9/2007 |
| JP | 2008-095196 A | 4/2008 |
| KR | 10-0139551 B1 | 6/1998 |
| KR | 10-2010-0070933 A | 6/2010 |

OTHER PUBLICATIONS

Notice of Allowance dated Dec. 10, 2012 in Korean Application No. 10-2011-0009814, filed Jan. 31, 2011.

Office Action dated Mar. 17, 2015 in Japanese Application No. 2013-523083.

* cited by examiner

HOT PRESS SINTERING APPARATUS AND PRESS ELEMENT

CROSS-REFERENCE TO RELATED APPLICATIONS

This application is the U.S. national stage application of International Patent Application No. PCT/KR2011/005542, filed Jul. 27, 2011, which claims priority to Korean Application Nos. 10-2010-0074432, filed Jul. 30, 2010 and 10-2011-0009814, filed Jan. 31, 2011, the disclosures of each of which are incorporated herein by reference in their entirety.

TECHNICAL FIELD

The disclosure relates to a hot press sintering apparatus and a press element used therefor.

BACKGROUND ART

In general, silicon carbide, boron carbide and silicon nitride are representative non-oxide materials and have mechanical characteristics, such as high strength, high hardness and wear-resistance characteristics as well as thermal characteristics, such as oxidation-resistance, corrosion-resistance, thermal shock resistance, and high-temperature strength characteristics.

Such non-oxide materials have the strong covalent bond, so the non-oxide materials must be subject to the sintering process under the specific condition, such as the high temperature condition, in order to process the non-oxide materials. The sintering process for the non-oxide materials includes the pressureless sintering, the reaction sintering, the recrystallization, the oxide bonding and the hot press sintering.

It is generally known in the art that the hot press sintering, in which pressure is applied under the high temperature condition, represents superior sintering characteristics. In a hot press sintering apparatus that performs the hot press sintering, a mold member, which may not be broken under the high temperature and high pressure, is required. In particular, since a metallic sintering aid is not added to provide high purity non-oxide material, the sintering process must be performed under the higher temperature and higher pressure condition with high purity member. Thus, the mold member must not be broken under the higher temperature and higher pressure condition.

The interior of the hot press sintering apparatus must be kept at a predetermined temperature to sufficiently heat the raw material such that the shape and the characteristics of the sintered material can be improved.

However, heat may be generated from parts connected to a press device in the hot press sintering apparatus. In this case, the characteristics of the sintered material, such as density of the sintered material, may deteriorate. This problem becomes severe when the sintered material having a relatively large size is manufactured.

DISCLOSURE OF INVENTION

Technical Problem

The embodiment provides a hot press sintering apparatus having a mold member which is rarely broken. The embodiment also provides a hot press sintering apparatus capable of improving the sintering characteristic and density of the sintered material by restraining heat emission.

Solution to Problem

A hot press sintering apparatus according to the embodiment includes a chamber; a mold member located in the chamber and including a mold space section to be filled with a raw material; a press member for pressing and processing the raw material in the mold member; and a heating member for heating an interior of the chamber, wherein the mold member includes a first mold part and a second mold part inserted into the first mold part and formed with the mold space section.

The second mold part has purity higher than purity of the first mold part.

The press member includes a press section adjacent to the mold space section and an adiabatic section positioned at the press section.

Advantageous Effects of Invention

The hot press sintering apparatus according to the embodiment includes first and second mold parts to improve the breaking strength of the mold member, so that the mold member can be prevented from being broken. The second mold part making contact with the raw material includes graphite having high purity and the first mold part that does not directly make contact with the raw material includes graphite having normal purity, so that the manufacturing cost for the mold member can be reduced.

In addition, a release sheet including the high purity graphite is attached to an inner wall defining a mold space section of the second mold part, so that the breakage of the mold member can be effectively prevented.

The hot press sintering apparatus according to another embodiment includes an adiabatic section to restrain heat emission caused by upper and lower moving members, so that the internal heat loss can be minimized, thereby supplying a greater amount of heat to the raw material. Therefore, the sintering process can be more easily performed, so that the sintering characteristics and the density of the sintered material can be improved. In addition, since the internal heat loss can be minimized, the power consumption required for driving the hot press sintering apparatus can be reduced.

The adiabatic section has a press part including graphite and a press member including a composite material, so that the size of the press member can be reduced due to the composite material having high strength. In addition, since the press part includes the graphite, the amount of use for the expensive composite material can be reduced, so that the manufacturing cost can be reduced.

MODE FOR THE INVENTION

Figure 1:
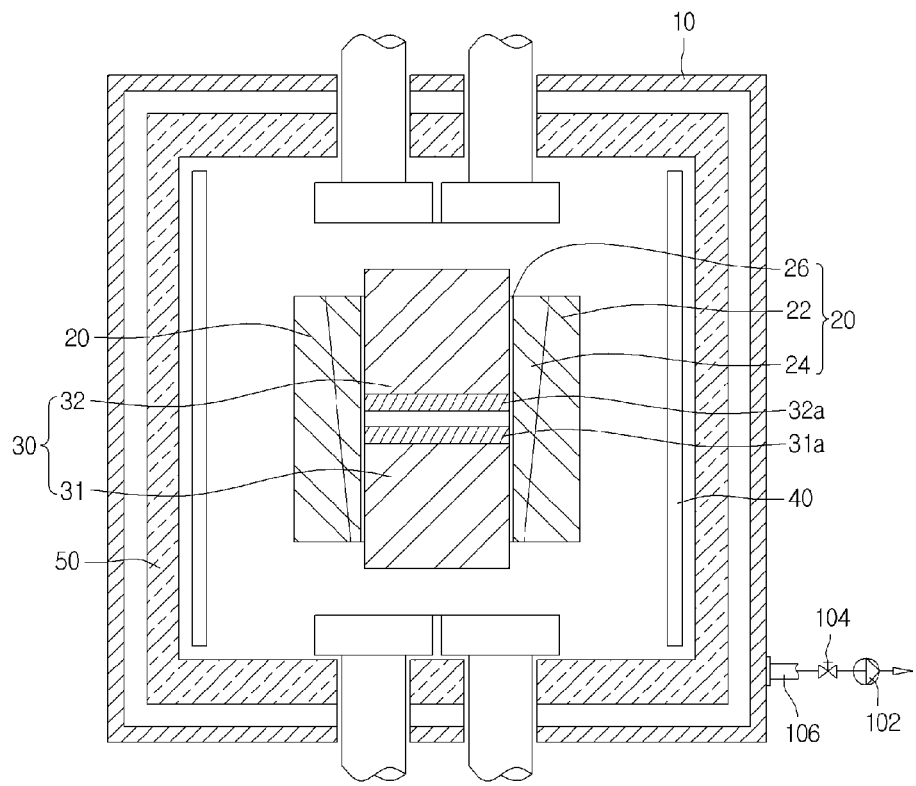
FIG. 1 is a schematic sectional view of a hot press sintering apparatus according to the first embodiment.

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

The thickness and size of each layer shown in the drawings may be exaggerated, omitted or schematically drawn for the purpose of convenience or clarity. In addition, the size of elements does not utterly reflect an actual size.

Hereinafter, the first embodiment will be described in detail with reference to the accompanying drawings.

FIG. 1 is a schematic sectional view of a hot press sintering apparatus according to the first embodiment.

Referring to FIG. 1, the hot press sintering apparatus 100 according to the first embodiment includes a chamber 10 under the vacuum state. A mold member 20, a press member 30, a heating member 4 and an adiabatic member 50 are provided in the chamber. The detailed description is as follows.

The chamber 10 is sealed to maintain the vacuum state. Since the chamber 10 is maintained in the vacuum state, the heating member 40 and other elements installed in the chamber 10 can be prevented from being oxidized and impurities may not be added to the raw material during the sintering process.

In order to keep the chamber 10 in the vacuum state, a vacuum pump 102 is located out of the chamber 10 in such a manner that the chamber 10 can be connected to the vacuum pump through an on/off valve 104 and an exhaust port 106. Thus, air is selectively exhausted from the chamber 10, so that the chamber 10 can be maintained in the vacuum state. In addition, an additional gas source (not shown), an additional on/off valve (not shown) and an injection port (not shown) can be provided to supply inert gas into the chamber 10.

The mold member 20 installed in the chamber 10 is filled with the raw material. The mold member 20 will be explained later in detail with reference to FIG. 2.

The press member 30 presses the raw material filled in the chamber 10 to process the raw material. The press member 30 includes a lower press member 31 located at a lower portion of the press member 30 and an upper press member 32 located at an upper portion of the press member 30. The press member 30 may include a material having endurance against the high temperature, for instance, graphite.

A graphite plate and/or a graphite sheet 32a including graphite having high purity of 99.99% to 99.9999% may be provided on a top surface of the lower press member 31. In addition, the graphite plate and/or the graphite sheet 32a including graphite having high purity of 99.99% to 99.9999% may be provided on a bottom surface of the upper press member 32.

The heating member 40 is positioned around the mold member 20 to heat the interior of the mold member 20 (in particular, the raw material filled in the mold member 20) installed in the chamber 10. Various types of heating members 40 can be utilized to heat the mold member 20. For instance, the heating member 40 may include the graphite to heat the mold member 20 by receiving external power.

The adiabatic member 50 is located between the heating member 40 and the chamber 10 to allow the mold member 20 to be kept in the predetermined temperature. The adiabatic member 20 may include the graphite to endure against the high temperature.

In the hot press sintering apparatus having the above structure, the raw material is filled in the mold member 20 in a state in which the lower press member 31 is positioned in the mold member 20, and the upper press member 32 presses the raw material while maintaining the high temperature condition using the heating member 40. Thus, the raw material is sintered into the desired shape under the high temperature and high pressure condition.

Figure 2:
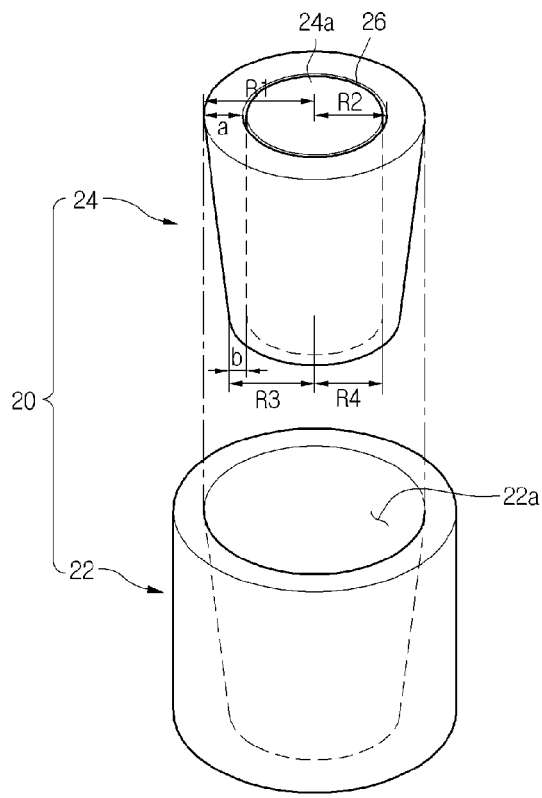
FIG. 2 is an exploded perspective view showing a mold member of a hot press sintering apparatus according to the first embodiment.

Hereinafter, the mold member 20 according to the first embodiment will be described in more detail with reference to FIG. 2. FIG. 2 is an exploded perspective view showing the mold member 20 of the hot press sintering apparatus 100 according to the first embodiment.

Referring to FIG. 2, the mold member 20 includes a first mold part 22 forming an outer appearance of the mold member 20 and a second mold part 24 inserted into an opening 22a of the first mold part 22 and including a mold space section 24a. The raw material is filled in the mold space section 24a and the raw material is pressed by the press member 30 (see, FIG. 1), so that the raw material is sintered into a desired shape.

An upper portion of the second mold part 24 may be narrower than a lower portion of the second mold part 24. For instance, the second mold part 24 is gradually narrowed from the top to the bottom thereof. In addition, the opening 22a of the first mold part 22 has a shape corresponding to an external shape of the second mold part 24. That is, the opening 22a is also gradually narrowed from the top to the bottom thereof.

Thus, the second mold part 24 can be easily inserted into the first mold part 22 by inserting the second mold part 24 into the opening 22a of the first mold part 22.

At this time, when a value obtained by subtracting a radius R2 of the mold space section 24a from a radius R1 of the second mold part 24 measured from the upper portion of the second mold part 24 is "a" and a value obtained by subtracting a radius R4 of the mold space section 24a from a radius R3 of the second mold part 24 measured from the lower portion of the second mold part 24 is "b", a ratio of "b" to "a" is in the range of 0.1 to 0.9. Thus, the second mold part 24 can be prevented from being separated from the first mold part 22 when the second mold part 24 is inserted into the opening 22a of the first mold part 22.

In addition, if the value obtained by subtracting the radius R4 of the mold space section 24a from the radius R3 of the second mold part 24 measured from the lower portion of the second mold part 24 is 0, the lower portion of the second mold part 24 may be broken. Thus, the lower portion of the mold part 24 has an area larger than that of the mold space section 24a.

The mold member 24 may include a material having superior endurance under the high temperature condition, such as graphite.

According to the present embodiment, the second mold part 24 defining the mold space section 24 filled with the raw material may include the graphite having high purity (for instance, 99.99% to 99.9999%) and the first mold part 22 into which the second mold part 24 is inserted may include the graphite having normal purity (for instance, not less than 90% but less than 99.99%).

Since the second mold part 24 directly making contact with the raw material includes the graphite having the high purity, the mold member 20 can be prevented from being broken under the high temperature and high pressure condition. For instance, the mold member consisting of the graphite having the normal purity according to the related art has the breaking strength of about 30 MPa, but the mold member 20 according to the present embodiment has the breaking strength of about 60 MPa. Thus, the mold member 20 according to the present embodiment represents the breaking strength twice greater than that of the mold member according to the related art, so that the mold member 20 can be effectively prevented from being broken. Therefore, the cost required for exchanging components of the hot press sintering apparatus 100 (see, FIG. 1) can be reduced.

In addition, the first mold part 22 includes the graphite having the normal purity, so that the manufacturing cost for the mold member 20 can be reduced.

In order to effectively prevent the breakage of the mold member 20, a release sheet 26 including the graphite having the high purity can be attached to an inner wall of the second mold part 24 defining the mold space section 24a. Thus, the mold member 20 and the press member 30 can be effectively prevented from being broken, so that the cost required for exchanging components of the hot press sintering apparatus 100 can be more reduced.

Further, as described above, if the graphite plate having the high purity and/or the graphite sheets 31a and 32a (see, FIG. 1) are positioned in the press member 30 making contact with the raw material, the graphite having the high purity can be distributed over the whole area of the mold member 20 and the press member 30 making contact with the raw material. Accordingly, the he mold member 20 and the press member 30 can be effectively prevented from being broken, so that the cost required for exchanging components of the hot press sintering apparatus 100 can be further reduced.

Although it has been described and illustrated that the mold space section 24a has the cylindrical shape, the embodiment is not limited thereto. The mold space section 24a may have various shapes depending on the desired shape of the sintered material.

Hereinafter, the second embodiment will be described with reference to FIGS. 3 to 5. The elements and structures the same as those of the first embodiment will not be further described below for the purpose of clarification and simplification of explanation.

Figure 3:
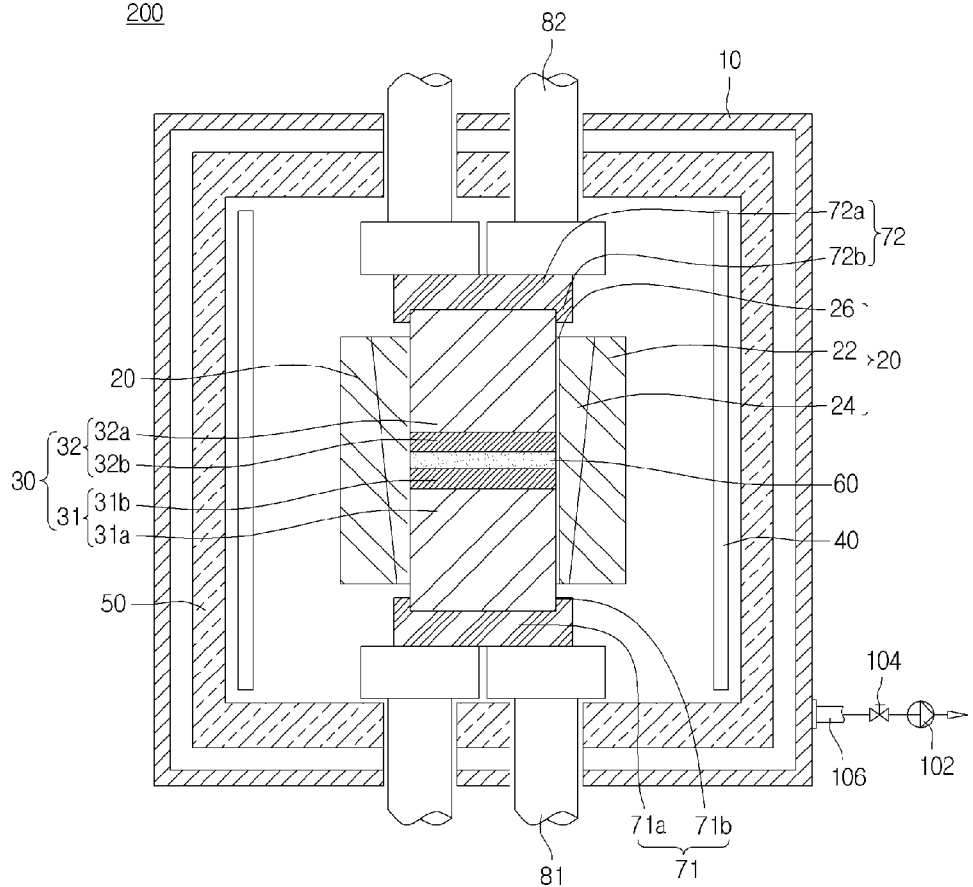
FIG. 3 is a schematic sectional view of a hot press sintering apparatus according to the second embodiment.
Figure 4:
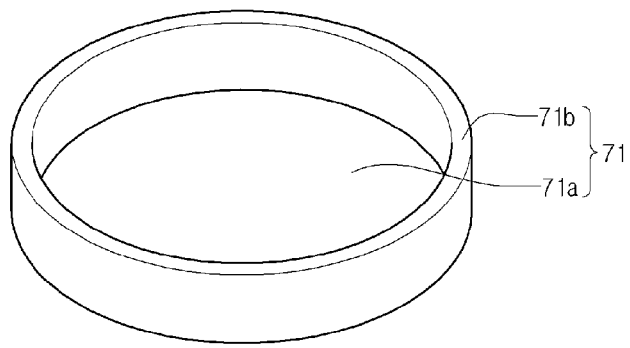
FIG. 4 is a perspective view showing a lower adiabatic section of a hot press sintering apparatus according to the second embodiment.
Figure 5:
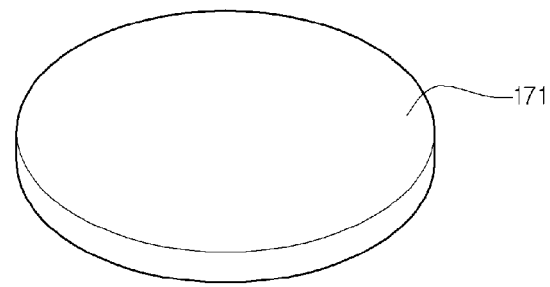
FIG. 5 is a perspective view showing a modified lower adiabatic section of a hot press sintering apparatus according to the second embodiment.

FIG. 3 is a schematic sectional view of the hot press sintering apparatus according to the second embodiment, FIG. 4 is a perspective view showing a lower adiabatic section of the hot press sintering apparatus according to the second embodiment and FIG. 5 is a perspective view showing a modified lower adiabatic section of the hot press sintering apparatus according to the second embodiment.

Referring to FIG. 3, the hot press sintering apparatus 200 according to the second embodiment includes a press member 30 including adiabatic sections 71 and 72 and upper and lower moving members 81 and 82 for moving the press member 30 up and down. The detailed description is as follows.

The press member 30 includes a lower press member 31 located below the row material and an upper press member 32 located above the raw material.

The lower and upper press members 31 and 32 include press sections adjacent to the mold space section and adiabatic sections 71 and 72 adjacent to the press sections. The press sections include first members 31a and 32a performing the actual press action and second members 31b and 32b adjacent to the mold space section. The second members 31b and 32b attenuate impact applied to the raw material when the pressing operation is performed. For instance, the second members 31b and 32b may have the plate shape.

The press sections may include materials having endurance against the high temperature. For instance, the first members 31a and 32a and the second members 31b and 32b may include the graphite. In detail, the first members 31a and 32a and the second members 31b and 32b may include the graphite having the impurity content of 20 ppm (parts per million) or less. Due to the press sections including the graphite having the high purity, the purity of the sintered material can be enhanced after the sintering process. For example, the SiC sintered material formed by using the hot press sintering apparatus 200 according to the second embodiment may have the purity of 5N (99.999%) or above.

In addition, a graphite sheet (not shown) may be provided on surfaces of the second members 31b and 32b facing the raw material to prevent the raw material or the press member 30 from being damaged.

The adiabatic sections 71 and 72 are positioned between the press sections and the upper and lower moving members 81 and 82 to prevent heat emission caused by the upper and lower moving members 81 and 82. In more detail, the upper and lower moving members 81 and 82 extend to the outside through the chamber 10 to receive the driving force from a press machine (not shown) in order to move the lower and upper press members 31 and 32 up and down. For this reason, heat may be emitted to the outside due to the upper and lower moving members 81 and 82. However, according to the present embodiment, the upper and lower press members 31 and 32 include the adiabatic sections 71 and 72, so that the heat emission can be prevented.

The adiabatic sections 71 and 72 may be divided into the lower adiabatic section 71 located at the lower end portion of the lower press member 31 and the upper adiabatic section 72 located at the upper end portion of the upper press member 32. Thus, the heat emitted to the outside along the upper and lower moving members 81 and 82 can be blocked by the adiabatic sections 71 and 72.

In order to minimize the heat emission caused by the upper and lower moving members 81 and 82, the lower and upper adiabatic sections 71 and 72 preferably have thermal conductivity lower than that of the press sections (that is, first members 31a and 32a and/or second members 31b and 32b). In addition, the lower and upper adiabatic sections 71 and 72 preferably have the heat-resistance property to endure against the high temperature.

For instance, the lower and upper adiabatic sections 71 and 72 may include composite materials. The composite material having superior heat-resistance property with low thermal conductivity includes a carbon fiber reinforced carbon (C/C) composite material. The C/C composite material can be obtained by adding carbon fiber reinforce to carbon matrix. The carbon matrix may include phenol resin, pitch, furan resin, and pyrolytic carbon, and the carbon fiber reinforce may include polyacrylonitrile and pitch.

In addition, the C/C composite material has thermal conductivity lower than that of the graphite constituting the press section. For instance, the graphite has the thermal conductivity of 180 W/mK, and the C/C composite material has the thermal conductivity of about 50 W/mK. Thus, heat transfer to the upper and lower moving members 81 and 82 can be reduced. The C/C composite material, which is woven in the vertical direction, has the thermal conductivity of about 45 to about 50 W/mK, and the C/C composite material, which is woven in the horizontal direction, has the thermal conductivity of about 10 W/Mk or less. Thus, the heat loss can be reduced if the lower and upper adiabatic sections 71 and 72 include the C/C composite material, which is woven in the horizontal direction.

The lower and upper adiabatic sections 71 and 72 are similar to each other. Hereinafter, the lower adiabatic section 71 will be described with reference to FIG. 4. The lower adiabatic section 71 includes a first part 71a formed at a bottom surface of the press section of the lower press member 31 (see, FIG. 3) and a second part 71b surrounding the lateral side of the press section. In this manner, if the lower press member 71 has a cap shape, the lower press member 71 can be fixedly inserted into the end of the press section, so that the stability can be improved when the lower press member 71 is mounted.

The first and second parts 71a and 71b may have the thickness in the range of 5 mm to 200 mm. If the thickness is less than 5 mm, the heat loss reduction efficiency may be lowered. If the thickness exceeds 200 mm, the manufacturing cost may increase.

Referring to FIG. 4, similar to the lower adiabatic section 71, the upper adiabatic section 72 (see, FIG. 3) may include a first part 72a and a second part 72b.

According to the present embodiment, the adiabatic section includes both upper and lower adiabatic sections 71 and 72, but the embodiment is not limited thereto. For instance, the adiabatic section may include only one of the upper and lower adiabatic sections 71 and 72.

According to the hot press sintering apparatus 200 of the second embodiment, the heat emission caused by internal components, in particular, the heat emission caused by the upper and lower moving members 81 and 82 can be suppressed by the lower and upper adiabatic sections 71 and 72, so that a greater amount of heat can be supplied to the raw material 60. Thus, the sintering process can be easily performed, so that the sintering characteristic can be improved and the sintering density of the sintered material can be enhanced. In addition, since the internal heat loss can be minimized, the power consumption can be reduced when driving the hot press sintering apparatus 100.

The heat transfer may become more difficult when the sintered member has a relatively large size (for instance, 300Φ or more). In this case, if the hot press sintering apparatus 200 according to the embodiment is used, the sintering characteristic can be more improved and the sintering density of the sintered material can be more enhanced.

Further, since the press sections of the lower and upper press members 31 and 32 include the graphite and the lower and upper adiabatic members 71 and 72 including the composite material are provided at the end portions of the lower and upper press members 31 and 32, the usage amount of the expensive composite material may be reduced while enhancing the strength and the hardness as compared with the case in which the presses sections and the lower and upper adiabatic members are formed by using the composite material.

Meanwhile, although the lower and upper adiabatic sections 71 and 72 are shown as a cap shape in FIGS. 3 and 4, the shape of the lower and upper adiabatic sections 71 and 72 can be variously modified. For instance, as shown in FIG. 5, an adiabatic section 171 having a plate shape can be positioned at one side of the upper press member 31 or the lower press member 32. In this case, the adiabatic section 171 can be manufactured through a simple process.

In the above hot press sintering apparatus 200, the sintered member can be manufactured by using various non-oxide ceramic materials. For instance, a susceptor can be manufactured by using silicon carbide.

Hereinafter, a method for manufacturing the susceptor by using the hot press sintering apparatus 200 according to the second embodiment will be described in more detail with reference to FIG. 3.

First, the raw material 60 is prepared. The raw material 60 may include silicon carbide.

In more detail, silicon carbide powder can be used as the raw material 60. In addition, granulated powder obtained by mixing silicon carbide with solvent and resin can be used as the raw material 60. The resin may include phenol resin and the solvent may include an alcoholic material or a water-based material. The alcoholic material includes methanol, ethanol or isopropyl alcohol (IPA), and the water-based material includes water, but the embodiment is not limited thereto.

Further, the raw material 60 in the form of the silicon carbide powder or the granulated powder can be placed in the mold space section 24a. In addition, it is also possible to place a molded material in the mold space section 24a after forming the molded material having a desired shape by preliminarily pressing the powder.

The raw material is filled in the mold member 20 in a state in which the lower press member 31 is positioned in the mold member 20, and the upper press member 32 presses the raw material while maintaining the high temperature condition using the heating member 40.

Thus, the silicon carbide is sintered corresponding to the internal shape of the mold member 20, the lower press member 31 and the upper press member 32, so that the susceptor is manufactured. For instance, the susceptor manufactured by the hot press sintering apparatus 200 according to the embodiment has the density of 3.15 g/cm$^3$ or above and the purity of 99.999% or above.

Hereinafter, the embodiment will be described in more detail with reference to the manufacture example and the comparative example. The manufacture example is for illustrative purpose only and the embodiment is not limited thereto.

Manufacture Example

Phenol resin and silicon carbide powder having the central grain size of 1.8 μm were mixed with IPA solvent.

Then, the mixture was granulated by using a spray dryer.

After that, the granulated raw material was loaded in the hot press sintering apparatus. Then, the granulated raw material was subject to the temperature of 2100° C. and the pressure of 40 MPa to manufacture the susceptor. The graphite having impurity of 20 ppm or less was included in the press section of the hot press sintering apparatus and the adiabatic section having a cap shape and including the C/C composite material was positioned at the end portion of the press section.

Comparative Example

The susceptor was manufactured similarly to the manufacture example except that that the hot press sintering apparatus has no adiabatic section.

The density and purity of the susceptor manufactured through the manufacture example and comparative example are shown in table 1.

TABLE 1

| | Density [g/cm$^3$] | Purity [%] |
|---|---|---|
| Manufacture example | 3.15 | 99.9997 |
| Comparative example | 3.08 | 99.9 |

Referring to Table 1, the density and the purity of the susceptor obtained through the manufacture example are higher than the density and the purity of the susceptor obtained through the comparative example. In other words, the hot press sintering apparatus according to the embodiment can improve the density and the purity of the susceptor.

Any reference in this specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A hot press sintering apparatus comprising:
a chamber;
a mold member located in the chamber and including a mold space section to be filled with a raw material;
a press member for pressing and processing the raw material in the mold member;
upper and lower moving members to move the press member up and down; and
a heating member for heating an interior of the chamber,
wherein the mold member includes a first mold part and a second mold part inserted into the first mold part, the second mold part being formed with the mold space section;
wherein the press member includes a press section adjacent to the mold space section and an adiabatic section disposed at the press section;
wherein the adiabatic section has a thermal conductivity lower than a thermal conductivity of the press section;
wherein the press section includes graphite, the graphite having an impurity with a concentration equal to or smaller than 20 parts per million (ppm);
wherein the adiabatic section is formed with a composite material including a carbon fiber reinforced carbon composite material, and
wherein the adiabatic section is positioned between the press section and the upper and lower moving members,
wherein the composite material is woven in a vertical direction,
wherein the composite material has a thermal conductivity equal to or smaller than 10 W/Mk,
wherein a width of the adiabatic section is smaller than a distance between two outmost lateral sides of the upper moving member or than a distance between two outmost lateral sides of the lower moving member,
wherein the adiabatic section includes a first part positioned at one surface of the press section and a second part surrounding a lateral side of the press section,
wherein a thickness of the first part and a thickness of the second part are both in a range of 5 mm to 200 mm, and
wherein the adiabatic section has a cap shape.

2. The hot press sintering apparatus of claim 1, wherein the second mold part has purity higher than purity of the first mold part.

3. The hot press sintering apparatus of claim 1, wherein a lower portion of the second mold part is narrower than an upper portion of the second mold part.

4. The hot press sintering apparatus of claim 3, wherein the lower portion of the second mold part is larger than the mold space section.

5. The hot press sintering apparatus of claim 3, wherein an area of the second mold part is gradually reduced from the upper portion to the lower portion of the second mold part.

6. The hot press sintering apparatus of claim 5, wherein, when a value obtained by subtracting a radius of the mold space section from a radius of the second mold part measured from the upper portion of the second mold part is "a" and a value obtained by subtracting a radius of the mold space section from a radius of the second mold part measured from the lower portion of the second mold part is "b", a ratio of "b" to "a" is in a range of 0.1 to 0.9.

7. The hot press sintering apparatus of claim 1, further comprising a sheet attached to an inner wall defining the mold space section, wherein the sheet has purity higher that purity of the second mold part.

8. The hot press sintering apparatus of claim 1, wherein the first mold part includes graphite having purity not less than 90% but less than 99.9%, and the second mold part includes graphite having purity in a range of 99.99% to 99.9999%.

9. The hot press sintering apparatus of claim 8, further comprising a sheet attached to an inner wall defining the mold space section, wherein the sheet includes graphite having purity in a range of 99.99% to 99.9999%.

10. The hot press sintering apparatus of claim 1, wherein the first mold part is formed with an opening having a shape corresponding to an outer appearance of the second mold part.

11. A press member of a hot press sintering apparatus, the press member comprising:
a press section for applying pressure; and
an adiabatic section positioned at one end of the press section;
wherein the press section includes graphite, the graphite having an impurity with a concentration equal to or smaller than 20 parts per million (ppm);
wherein the adiabatic section is formed with a composite material including a carbon fiber reinforced carbon composite material;
wherein the adiabatic section has a thermal conductivity lower than a thermal conductivity of the press section;
wherein the adiabatic section includes a first part positioned at one surface of the press section and a second part surrounding a lateral side of the press section; and
wherein a thickness of the first part and a thickness of the second part are both in a range of 5 mm to 200 mm,
wherein the composite material is woven in a vertical direction,
wherein the composite material has a thermal conductivity equal to or smaller than 10 W/Mk,
wherein the adiabatic section includes a first part positioned at one surface of the press section and a second part surrounding a lateral side of the press section, and
wherein a thickness of the first part and a thickness of the second part are both in a range of 5 mm to 200 mm, and
wherein the adiabatic section has a cap shape.

* * * * *